(12) United States Patent
Howard

(10) Patent No.: US 7,251,735 B2
(45) Date of Patent: Jul. 31, 2007

(54) BUFFER OVERFLOW PROTECTION AND PREVENTION

(75) Inventor: Robert James Howard, Clifton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 842 days.

(21) Appl. No.: 10/625,114

(22) Filed: Jul. 22, 2003

(65) Prior Publication Data

US 2005/0022172 A1 Jan. 27, 2005

(51) Int. Cl.
*G06F 12/14* (2006.01)
(52) U.S. Cl. .......................... 713/189; 710/55
(58) Field of Classification Search .................. 710/55
See application file for complete search history.

(56) References Cited

U.S. PATENT DOCUMENTS

| | | | |
|---|---|---|---|
| 6,298,445 | B1 | 10/2001 | Shostack et al. |
| 6,301,699 | B1 | 10/2001 | Hollander et al. |
| 6,412,071 | B1 | 6/2002 | Hollander et al. |
| 2002/0144141 | A1 | 10/2002 | Edwards et al. |
| 2003/0014664 | A1 | 1/2003 | Hentunen |
| 2003/0014667 | A1 | 1/2003 | Kolichtchak |
| 2003/0065929 | A1* | 4/2003 | Milliken ...................... 713/189 |
| 2003/0217277 | A1* | 11/2003 | Narayanan ................... 713/187 |
| 2004/0168078 | A1* | 8/2004 | Brodley et al. ............. 713/200 |
| 2004/0255146 | A1* | 12/2004 | Asher et al. ................. 713/200 |
| 2005/0091528 | A1* | 4/2005 | Debar et al. ................. 713/201 |

OTHER PUBLICATIONS

Shao et al., "Defending Embedded Systems Against Buffer Overflow via Hardware/Software", 2003, IEEE, pp. 1-10.*

* cited by examiner

*Primary Examiner*—Matthew B Smithers
(74) *Attorney, Agent, or Firm*—DeMont & Breyer, LLC

(57) ABSTRACT

A method and apparatus for protecting against a buffer over flow attack. In one variation, an executable software program is divided into an executable image, a data image, and an execution history image. The operating system processes an executable statement in the executable image. Other statements are processed in the data image. In a second variation, the execution history image is made use of in addition to the tasks of the first variation. Each statement is classified as either mutable or immutable. The usage of statements is recorded in the execution history image. If a mutable statement has over-written an immutable statement memory location, then the program is terminated. Optionally, the entire program is re-mapped using the execution history image such that immutable statements cannot overwrite mutable statements.

28 Claims, 9 Drawing Sheets

BUFFER OVERFLOW PROTECTION AND PREVENTION

FIELD OF THE INVENTION

The present invention relates to computer security in general, and, more particularly, to software for combating buffer overflow attacks.

BACKGROUND OF THE INVENTION

The security of computer systems is a topic of serious concern to almost every enterprise in today's society. Broadly speaking, there are two aspects of computer security. One aspect concerns the unwanted escape of information from the computer system to the outside world. The threat of unwanted escape of information takes several forms. In one form, hackers attempt to gain access to an enterprise's computer system to pilfer valuable information. In another form, disloyal employees or other "insiders" attempt to accomplish the same end by the access that they legitimately have. Another aspect of computer security concerns the invasion of unwanted objects, such as viruses, from the outside world into the computer system.

FIG. 1 is a schematic illustration of computer system 100. The computer system has a plurality of user stations connected to it. Computer system 100 includes communication device 102, CPU 104, memory 112 and a plurality of system resources, such as storage unit 106, printer 108 and multi-media unit 110, interconnected as shown. Computer system 100 is connected to external users via computer systems 116, 118 and 120, and via network 114.

The operating system (of computer system 100) is assumed to allow discretionary access to components of computer system 100. That is, programmers can grant or revoke user access rights to objects, such as files, directories, computer programs and the like. For this example, each external user that accesses computer system 100 via computer systems 116, 118 and 120 is allocated a different level of authorization, with respect to computer system 100. The user using computer system 116 is predetermined as a super-user, thereby being able to access and control all of the resources of computer system 100. The user using computer system 118 is predetermined as a high-level user, thereby being able to access storage unit 106, printer 108 and multi-media unit 110. The user using computer system 120 is predetermined as a low-level user, thereby being able to access printer 108.

While it is running, a computer program might be required to access objects that the user executing the program is not allowed to access. Conventionally, the administrator of a computer system can provide the computer program with predetermined enhanced privileges. This enables a non-privileged user, such as the user of system 120, to access a privileged computer-system resource in a controlled manner.

Computer system 100 is vulnerable to attack techniques that attempt to exploit enhanced privileges (e.g., gaining super-user privileges, etc.) within computer system 100 via network 114 and communication device 102. One attack technique is known as "induced buffer overflow." Buffer overflow, a condition that is well known in the art, is caused when a computer system attempts to write past the end of a defined array. Buffer overflow can be exploited in order to gain super-user privileges, thereby providing non-authorized users with access to privileged resources. Induced buffer overflow is discussed with reference to FIGS. 2A, 2B, and 3.

As an aid to understanding the discussion of induced buffer overflow, the following background and definitions are provided.

A computer program comprises a set of instructions. Often, several instructions are grouped to form a "function." When the instructions are executed by a computer system, a "computer-program process" is created. Conventionally, a computer-program process is the manner of execution of the computer program. A computer program process is allocated an array of user address space. User address space is a memory device wherein the computer program processes are executed.

FIG. 2A is a schematic illustration of a conventional array of user address space locations, which are generally denoted 222. User address space is organized in three regions: text region 224, stack 226, and data region 228.

Text region 224 includes text, which are machine instructions that the processor executes. The execution of text is non-linear; the flow of execution can skip text, jump to non-contiguous text locations, or call functions on certain conditions. Data region 228 is a memory space for variables and dynamic buffers. Static variables are stored in data region 228. Stack 226 is a contiguous block of memory containing data and, occasionally, executable code. Stack 226 contains and handles local variables, which are used by a function. Stack 226 also passes parameters to and from functions.

A fixed size of memory is allocated for stack 226. The amount of this memory space that is used is dynamically adjusted (by the kernel) at run time. The bottom of stack 226 is at a fixed address. Depending on the implementation, the stack will either grow "down" (i.e., towards lower memory addresses) or up (see, e.g., FIG. 2A).

FIG. 2B is a schematic illustration of stack 226 of user address space 222 that is shown in FIG. 2A.

When a computer program process is started, the computer system (e.g., computer system 100, etc.) dynamically allocates an available stack segment 232 of stack 226 to the process. The stack segment is de-allocated when the process is completed.

When a function is invoked within a process, a stack segment 234 is allocated to the computer program process. Stack segment 234 includes the information needed by a single execution of a function. This information is stored in a plurality of fields. The fields include temporary values field 246, local data field 244, return address field 242, optional access link field 240, optional control link field 238, and actual parameters field 236.

Temporary values field 246 stores the results of evaluation of expressions and local data field 244 stores data for the execution of the process. Return address field 242 includes the return address for the calling function. The return address is the computer program instruction following the function call. Optional access link field 240 points to data held in other stack segments, and optional control link field 238 and the actual parameters field 236 stores the parameters to be passed to the calling program or function. As indicated above, this stack segment (i.e., stack segment 234) is de-allocated when the function ends.

FIG. 3 is a schematic illustration of a conventional function stack segment, generally referenced 348, and of a computer program, generally referenced 356. Function stack segment 348 is equivalent to stack segment 234 of FIG. 2B.

For the example depicted in FIG. 3, computer program 356 includes three program elements 358, 360 and 362, which are performed in sequence. Program elements 358 and 362 are general computer program instructions. Program element 360 is a function call. Accordingly, function call 360 is performed after computer instruction 358 and before computer instruction 362. When function 360 is called, the flow control of the computer program 356 is altered. Typically, a function receives the computer program control, performs a predetermined task and then returns the computer program control to the statement or instruction that follows the function call.

Computer system 100 (FIG. 1) automatically determines a function return address 350, for function 360, and stores it within stack segment return-address field 242 of user address space 222 (FIGS. 2A and 2B). Function return address 350 indicates the location of the computer program instruction that follows function 360, which in the present example is instruction 362.

Induced buffer overflow is caused as follows. A string containing a computer program or other executable code is passed, as a parameter, into function stack segment 352 by function 360. The string is stored within actual parameters field 236 of function stack segment 352 (see FIG. 2B). But the length of this string exceeds the length of actual parameters field 236.

Since the string exceeds the length of actual parameters field 236, it overwrites the end of actual parameters field 236. As a consequence, the string replaces function return address 350, which is stored at return address field 242 (FIG. 2B), with initial address 354 (i.e., first address of the actual parameters field 236 of FIG. 2B) of function stack segment 352.

Initial address 354 points to the content of actual parameters field 236 (FIG. 2B) of function stack segment 352 as the next program instruction to be executed after function 360. It will be appreciated by those skilled in the art that the content of function stack segment 352 can contain a valid computer instruction, capable of performing any predetermined operation, such as granting access to any resource within system 100.

Conventionally, if the set of privileges granted to function 360 by the computer system administrator are enhanced privileges, then such privileges are granted to the computer program residing within the function stack segment 352. Users executing function 360 therefore receive such enhanced privileges (e.g., super-user privileges, etc.). In this fashion, a user is able to gain enhanced privileges without the express permission of the computer system administrator.

Several known techniques are now described for combating buffer overflow attacks.

FIG. 4 is flowchart illustrating a high-level view of a first known method for countering buffer overflow security vulnerabilities, as disclosed in published application US 2002/0144141 A1. According to FIG. 4, call processing 402 of a function call is modified to place a return address on the stack, and then a random amount of space is added to the stack. This random value is placed in a known position in the stack, or kept in a non-accessible CPU register. The rest of the stack is built normally. When return-processing 406 is called, it finds the number of bytes added to the stack and finds the return address on the stack and returns as normal.

This method lacks a means of detecting an attack, except for processor crashes. And its effectiveness is limited to a particular mode of buffer overflow attack, namely, redirecting the return stack.

FIG. 5 is a block diagram of a second known software architecture for countering buffer overflow, as disclosed in published application US 2003/0014664 A1. Generally, buffer-overflow attacks can be written so that the "nop" (no operation) part of a program stack is left out and only the return address is included after the function (executable) code part. Also a function code part can be written in a variety of ways. But in many buffer-overflow attacks, at least a small part of the return address will be present.

In this second method, a search is performed for that return address, or a small part of it (i.e., a pointer or part of it), as per operation 500. This is called a "pointer fingerprint." The pointer fingerprint can also include, in addition to the relevant pointer, a number of other bits having no significance in the searching process. If the fingerprint is found at task 504, detection of a buffer overflow attack is reported at task 506.

This second prior-art method is therefore capable of detecting buffer overflow attacks. But this approach assumes (incorrectly) that certain critical bit-patterns will always occur in any stack buffer overflow attack.

FIG. 6 depicts a block diagram of a third software architecture for countering buffer overflow, as disclosed in published application US 2003/0014667 A1. As depicted in FIG. 6, the architecture includes a page-fault proxy handler for connection to an original page fault handler and a paging table in which supervisor flags for all entries for all writable memory pages have been initially set. The page fault proxy handler 600 comprises page fault detector 664, page fault filter 666, execution address checker 668, mitigation module 670, and controlled memory access module 672. The filter passes, to the original page fault handler 674, page faults that do not arise from an attempt to access a writable page by a user mode program. The execution address checker 668 passes, to the mitigation module 670, only those page faults arising from an attempt by a user mode program to execute from a writable page in a predetermined section of executable memory. The execution address checker 668 passes, to controlled memory access module 672, all other page faults arising from an attempt by a user mode program to access the predetermined section of executable memory. Controlled memory access module 672 permits the user program to access the writable page by changing an associated supervisor flag in the paging table.

This method detects buffer overflows, but requires modification of the operating system/software and is computer-architecture dependent.

FIG. 7 is a block diagram of a fourth known software architecture for countering buffer overflow, as disclosed in published application U.S. Pat. No. 6,301,699 B1. With reference to FIG. 7, the system performs a code disassembly procedure 702 on an input string, which includes data from the function interception. The input string is the parameter transferred by the function to the stack segment. The code disassembly procedure can be performed according to a plurality of known methods. Disassembly of the input string produces an assembly language computer program.

Next, at task 704, the system analyzes the computer program produced in the previous task to identify possible execution paths. A disassembled computer program usually includes a plurality of execution paths, which are linked by a plurality of jump instructions. A jump instruction is an instruction that specifies another instruction in the program at which execution continues. In contrast, execution after a non-jump instruction always proceeds to the following instruction within the code sequence. The disassembled code is scanned so as to determine which of the targets of each jump instruction are valid targets.

By analyzing this information and creating an execution path graph, this method attempts to determine whether the code is a valid computer program. An execution path graph records the possible execution paths according to valid jump instructions and corresponding target instructions.

Furthermore, in this method, the disassembled code is scanned so as to determine which of the jump instructions is invalid. An invalid jump instruction is one that does not end with an existing valid target instruction.

At task 708, the system analyzes the possible execution paths found to determine if the possible execution paths contain a system call. The presence of a system call indicates a likelihood of a buffer overflow attack so as to obtain super user privileges.

Next, the system determines if an attack is in progress. This is evaluated by calculating a buffer overflow score. The score is based on the number of invalid jumps detected in a previous step or if a system call is detected along one of the possible execution paths. The calculated score is compared to a threshold value that has been determined (e.g., by the system administrator, etc.) to be indicative of a buffer overflow attack. The program continues execution (task 710) or not (task 712) based on this comparison. This method provides protection against detected attacks, but not against undetected attacks.

The various prior-art software architectures discussed above do not provide protection against undetected buffer attacks. Consequently, computer systems remain vulnerable to buffer overflow attacks.

SUMMARY OF THE INVENTION

The illustrative embodiment of the present invention provides protection from a buffer overflow attack—even if it's not detected. The illustrative embodiment of the present invention is global in scope, substantially independent of computer architecture, and allows for execution encryption.

In a first variation of the illustrative embodiment of the present invention, an executable software program is divided into an executable image, a data image, and an execution history image. The operating system processes an executable statement, a local constant, or a singly de-referenced pointer in the executable image. For all other data, data write-back, or data read-back statements, the statement is accessed in the data image using a computed offset into the data image from the executable image. Then the statement is acted upon in the data image.

In a second variation of the illustrative embodiment of the present invention, the execution history image is employed in addition to the tasks of the first variation of the illustrative embodiment of the present invention. As in the first variation, the software program is divided into an executable image, a data image, and an execution history image. Then, each statement is classified as either mutable (changeable) or immutable (not to be changed) in the execution history image. The operating system processes an executable statement, a local constant, or a singly de-referenced pointer in the executable image. For all other data, data write-back, or data read-back statements, the statement is accessed in the data image using a computed offset into the data image from the executable image. Then the statement is acted upon in the data image.

The usage of executable statements or data image statements is recorded in the execution history image. If a mutable statement has over-written an immutable statement memory location, then the program (process) is terminated.

Optionally, if it is decided that the execution history image is now mature, then the entire program is re-mapped using the execution history image such that immutable statements cannot over-write mutable statements.

DETAILED DESCRIPTION

Figure 1:
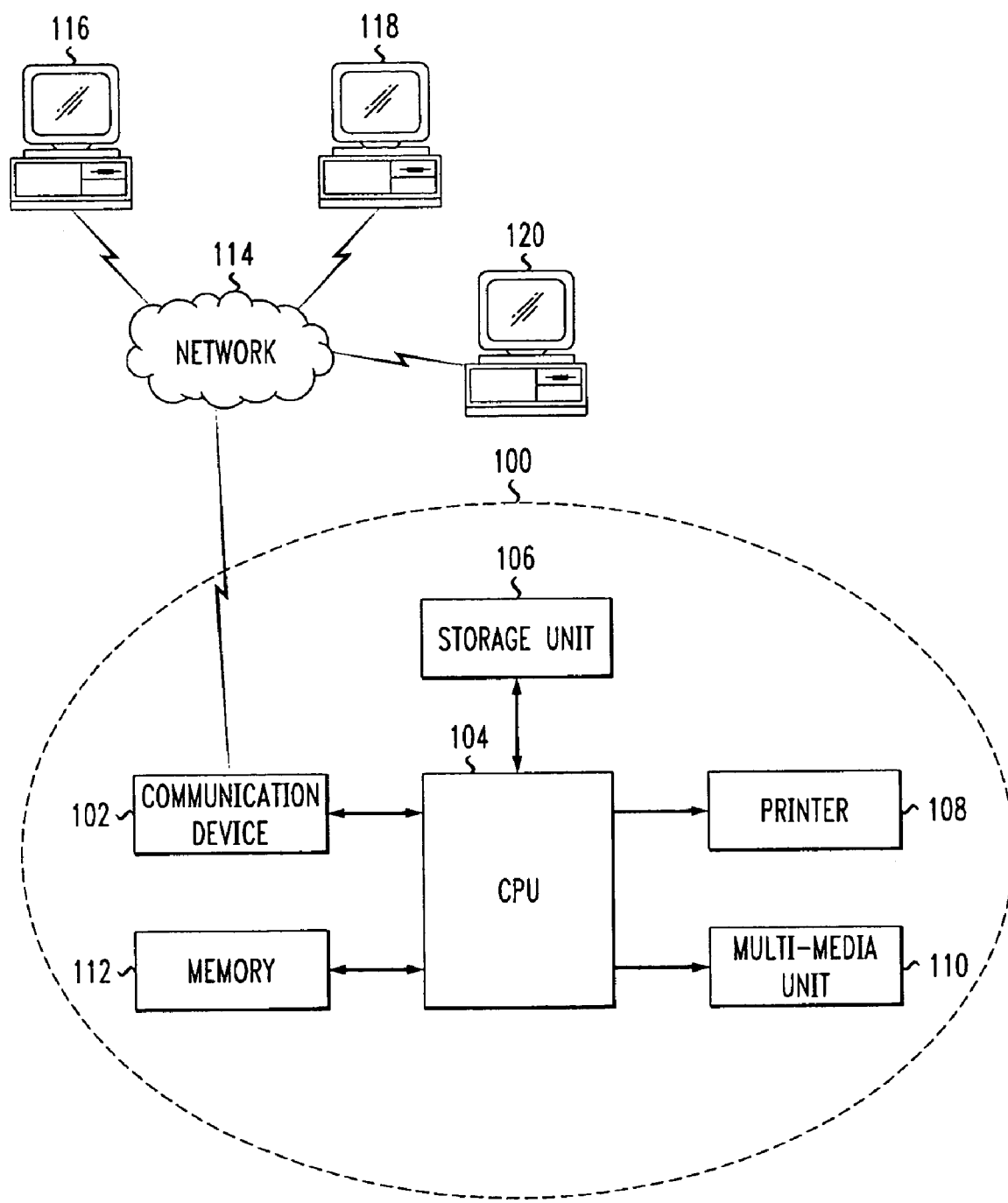
FIG. 1 is a schematic illustration of computer system 100.
Figure 2A:
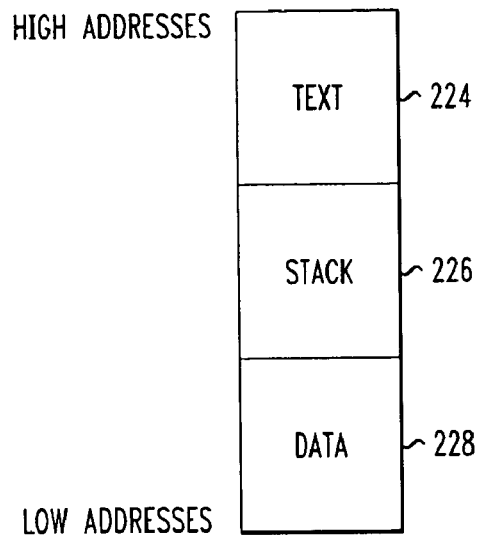
FIG. 2A is a schematic illustration of a conventional array of user address space locations, which are generally denoted 222.
Figure 2B:
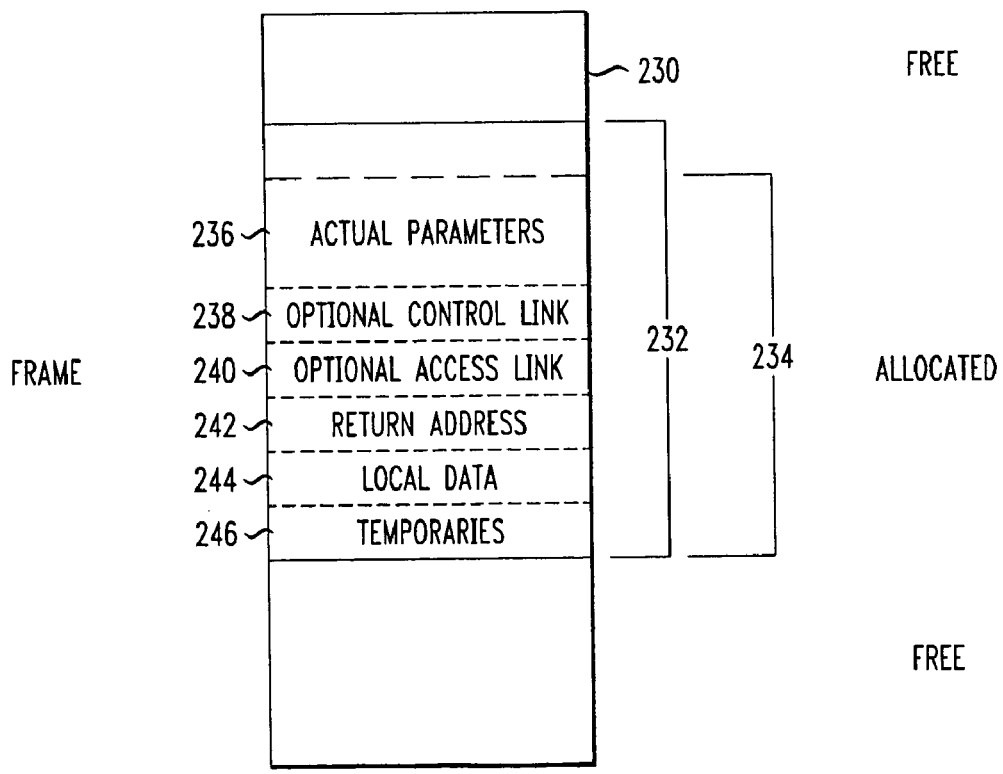
FIG. 2B is a schematic illustration of stack 226 of user address space 222 that is shown in FIG. 2A.
Figure 3:
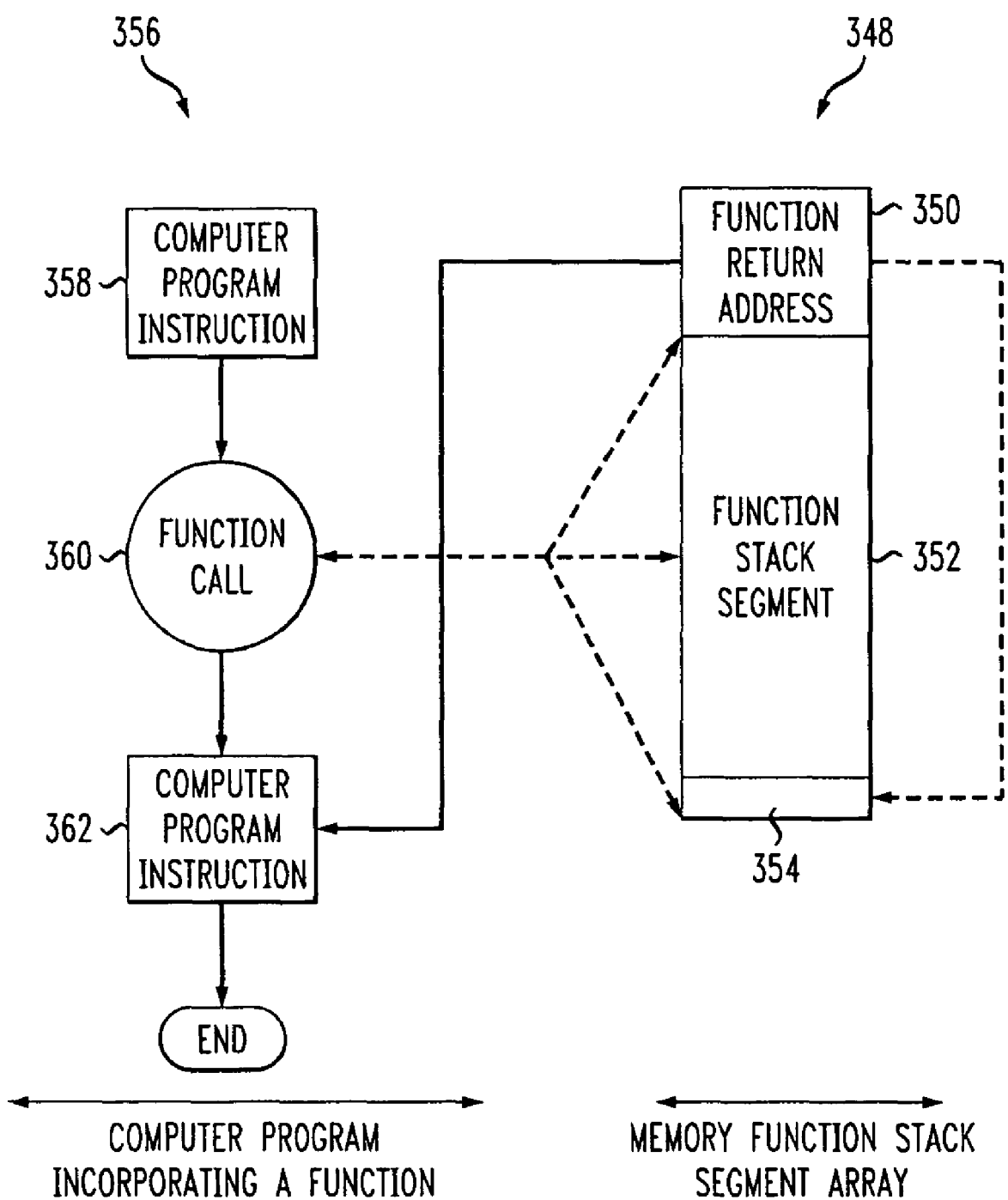
FIG. 3 is a schematic illustration of a conventional function stack segment, generally referenced 348, and of a computer program, generally referenced 356.
Figure 4:
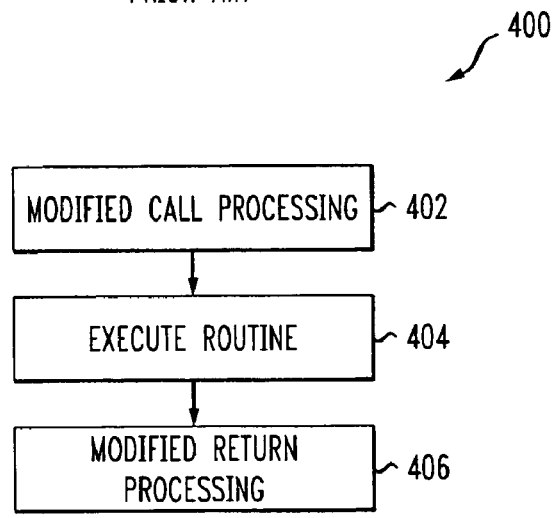
FIG. 4 is flowchart illustrating a high-level view of a first known method for countering buffer overflow security vulnerabilities.
Figure 5:
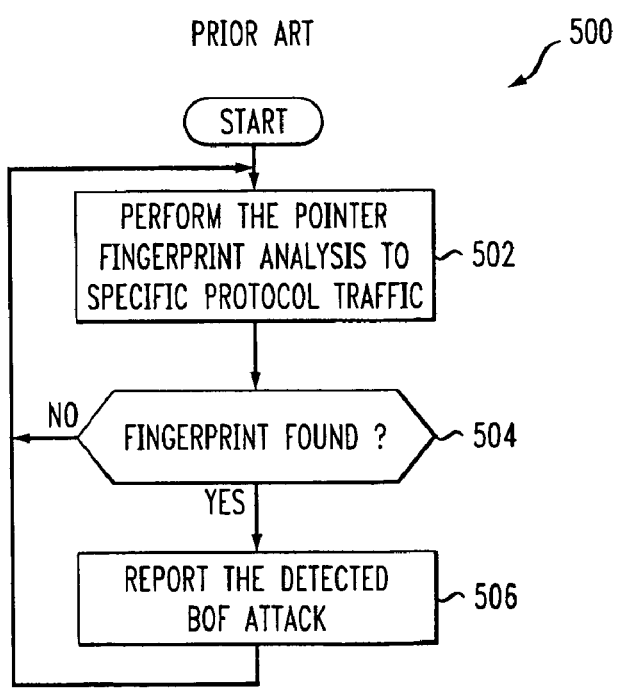
FIG. 5 is a block diagram of a second known software architecture for countering buffer overflow.
Figure 6:
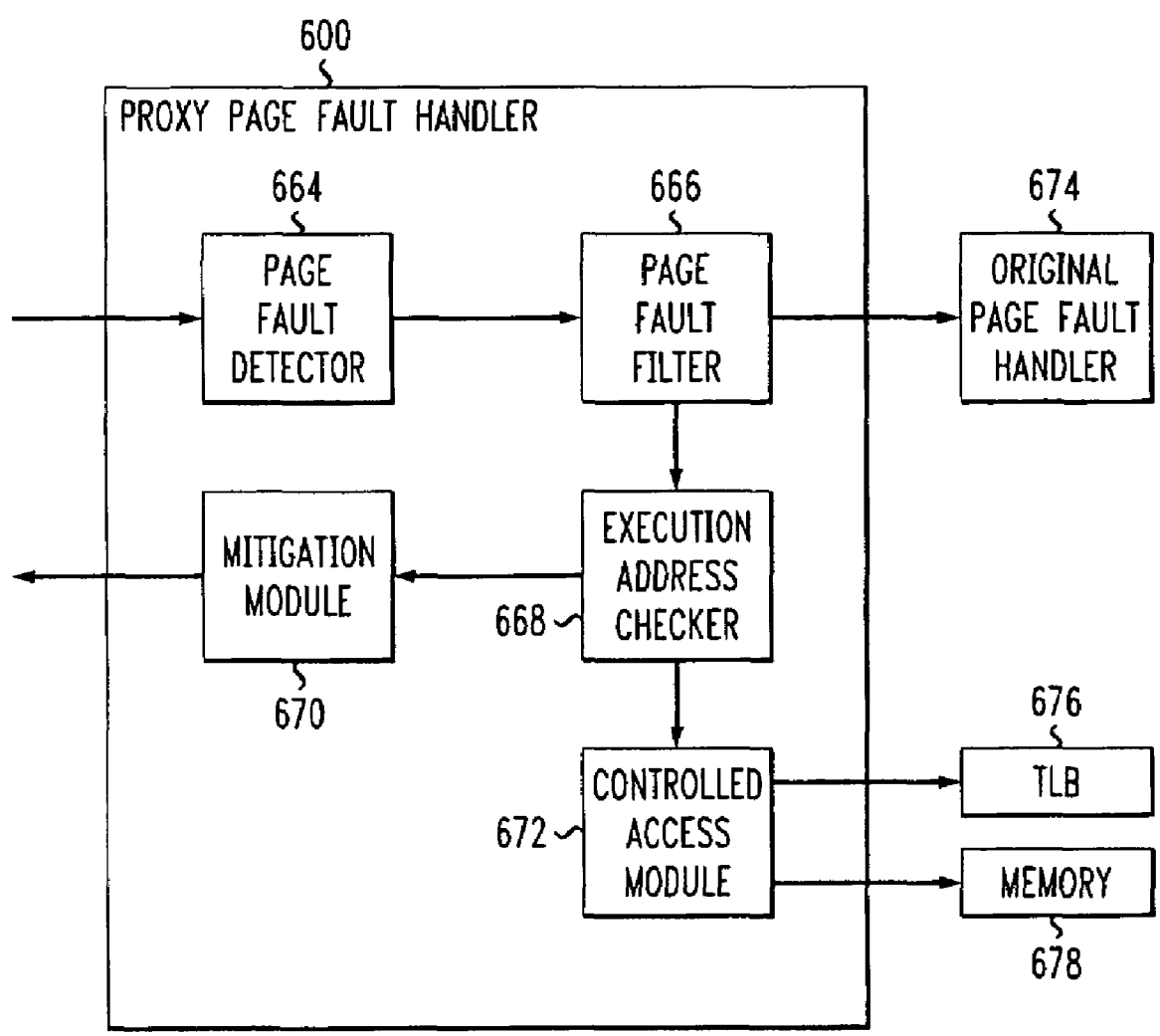
FIG. 6 depicts a block diagram of a third known software architecture for countering buffer overflow.
Figure 7:
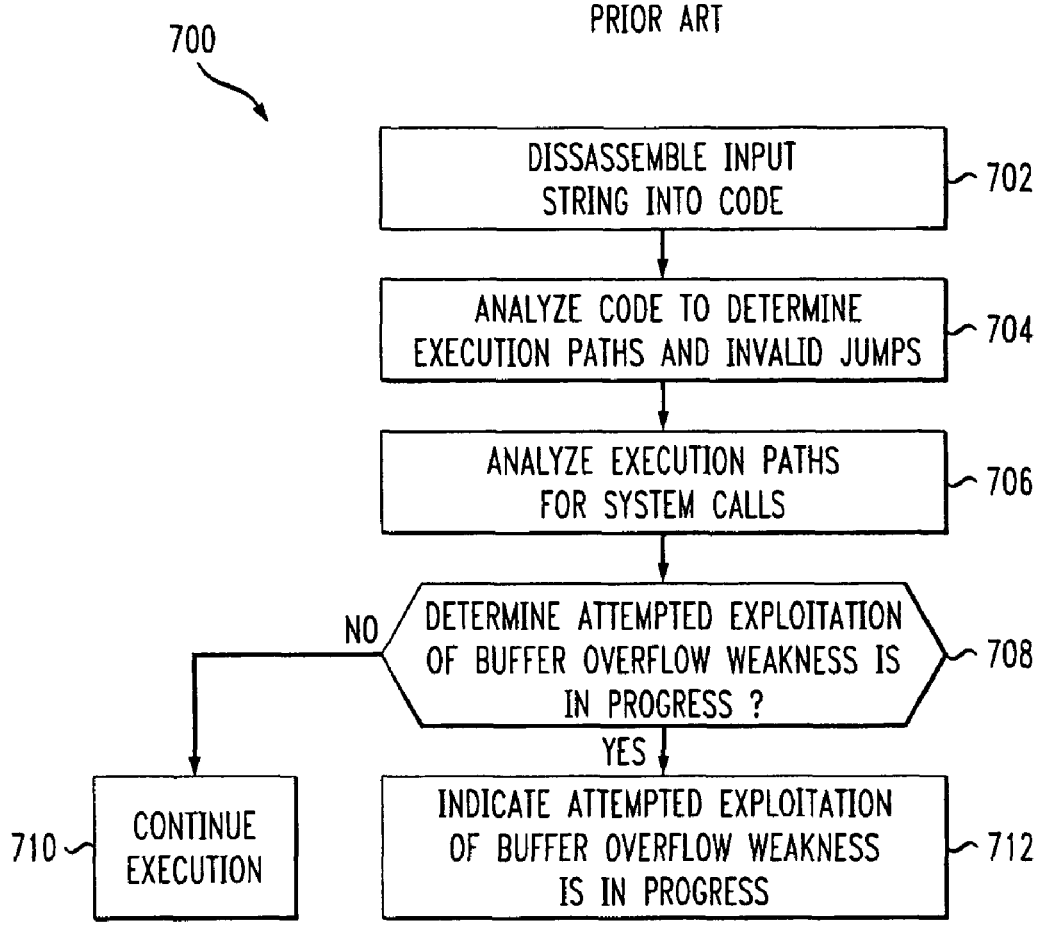
FIG. 7 is a block diagram of a fourth known software architecture for countering buffer overflow.
Figure 8:
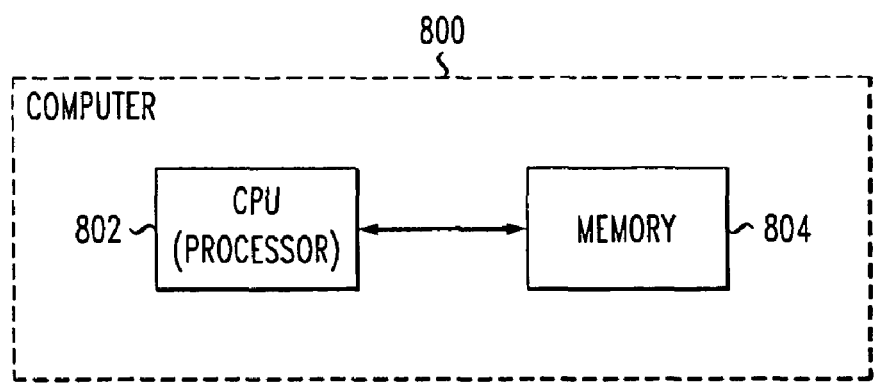
FIG. 8 depicts the host computer of the illustrative embodiment of the present invention.

FIG. 8 depicts the host computer 800 of the illustrative embodiment of the present invention. Host computer 800 comprises a central processing unit (CPU or processor) 801 and memory 802.

Processor 802 is a general-purpose or special-purpose processor that is capable of performing the functionality described below and with respect to FIGS. 9 through 12. In particular, processor 802 is capable of storing data into memory 804, retrieving data from memory 804, and of executing programs stored in memory 804. It will be clear to those skilled in the art, after reading this specification, how to make and use processor 802.

Memory 804 further comprises a machine-readable medium, such as hard disk, flash memory, or other non-volatile storage, which contains images of the user program, data, and operating system. Memory 802 also comprises random-access memory for executing the user programs and the operating system after loading by processor 802. It will be clear to those skilled in the art how to make and use memory 804.

Figure 9:
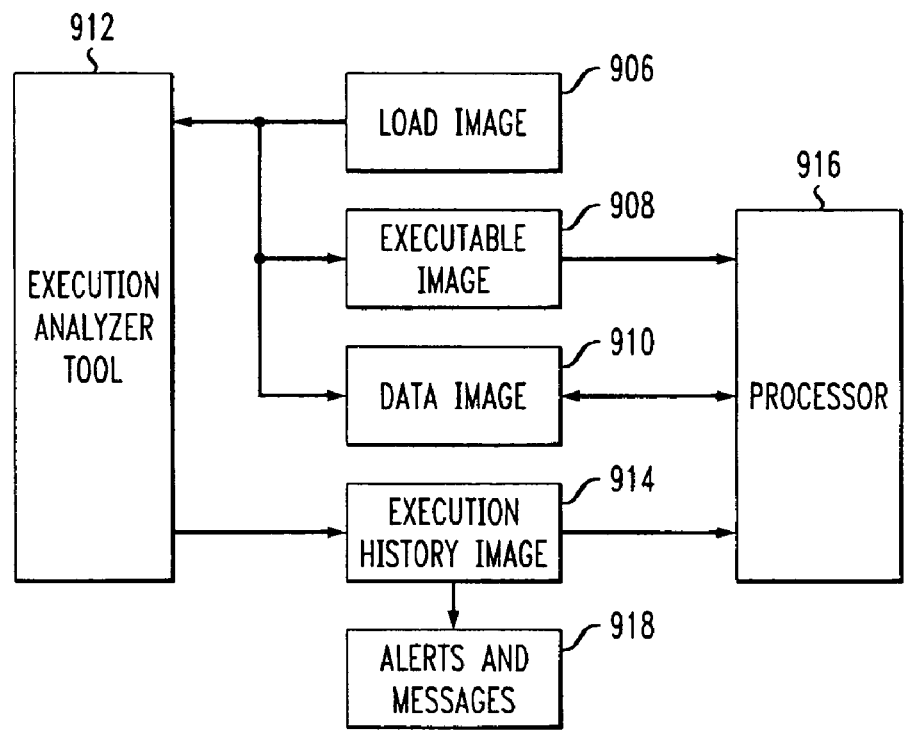
FIG. 9 depicts a block diagram of elements common to variations of the illustrative embodiment of the present invention.

An approach of the illustrative embodiment of the present invention is to modify the operating system so that critical software is run in a more robust environment. FIG. 9 depicts a block diagram of elements common to variations of the illustrative embodiment of the present invention. Those elements include load image 906 of a user program, software module 912, and processor 916.

Load image 906 is stored in a machine-readable medium and is divided into executable image 908, data image 910, and execution history image 914. Software module 912 analyzes load image 906 and places the results of that analysis in execution history image 914. Processor 916 interacts with each image in memory 804, where executable statements are executed by processor 916 from executable image 908, data read and write statements are processed in data image 910 by processor 916, and processor 916 logs usage of executable instructions and data read/writes in execution history image 914. The execution history image also produces alerts and messages 918 for acting upon data overflow attacks.

Figure 10:
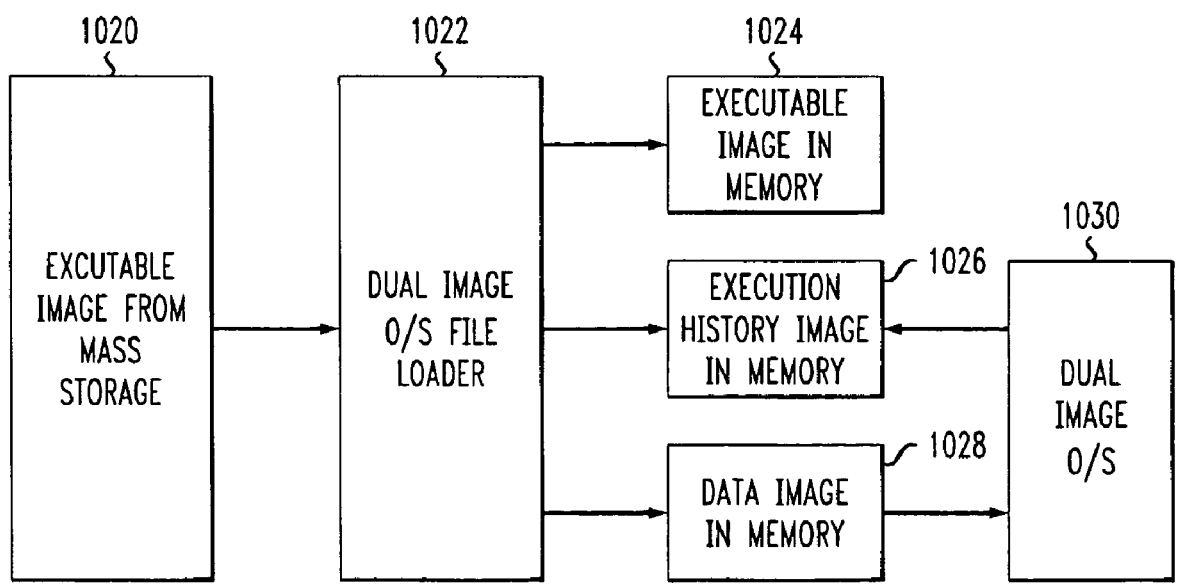
FIG. 10 depicts the division of program images shown in FIG. 9 from the perspective of the operating system.

FIG. 10 depicts the division of program images shown in FIG. 9 from the "perspective" of the operating system. An executable image of the entire program comprising executable image 909, data image 910, and execution history image 914 resides in mass storage 1020. Dual-image operating system file loader 1022 loads these images into random-access memory, whereby executable image in memory 1024, execution history image in memory 1026, and data image in memory 1028 are established. Also residing in random-access memory is dual-image operating system 1030, which is capable of running the three "images in memory" at once.

Figure 11:
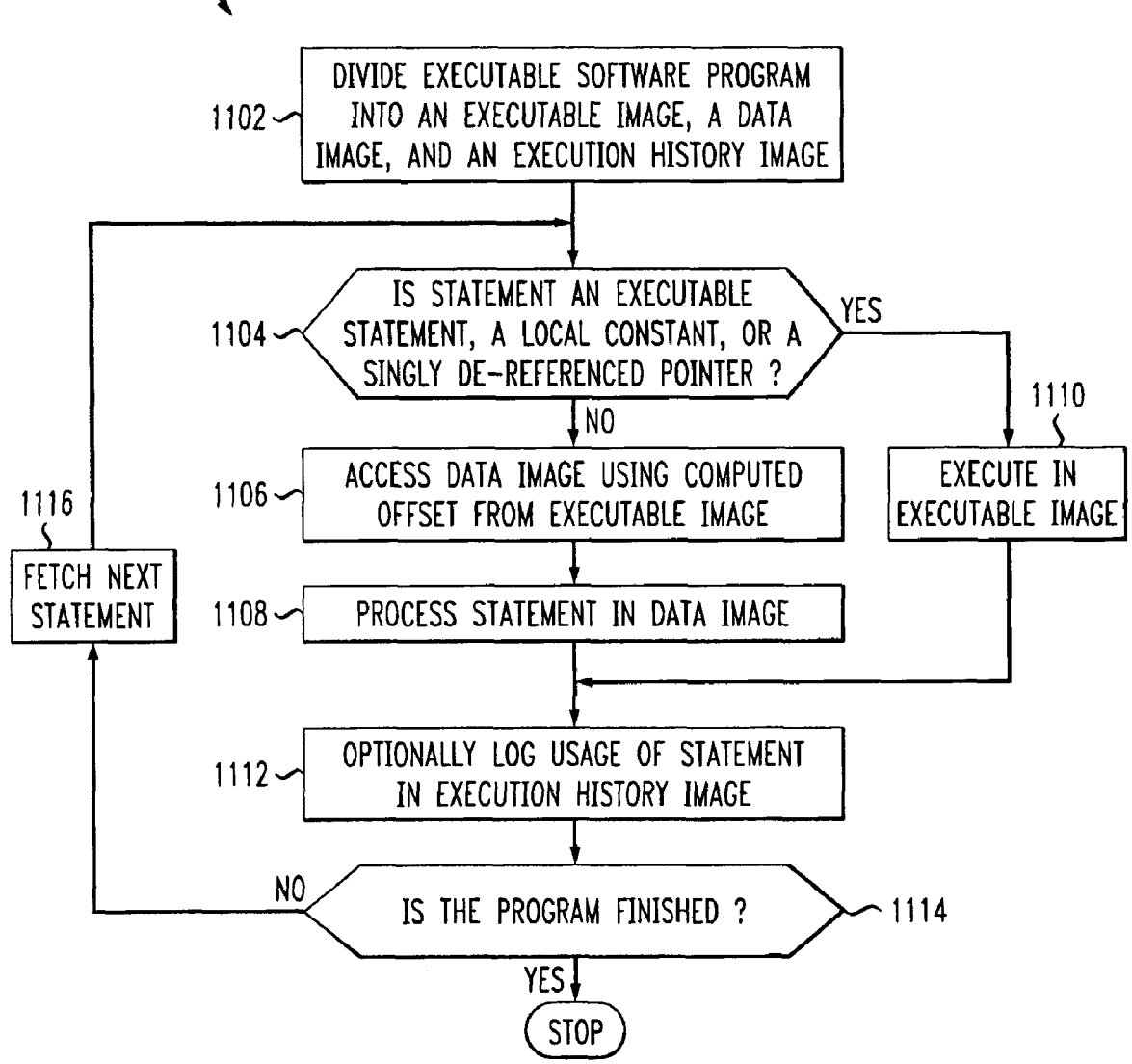
FIG. 11 is a flow chart depicting a first variation of the illustrative embodiment of the present invention.

FIG. 11 is a flowchart depicting a first variation of the illustrative embodiment of the present invention. As already described, at task 1102, an executable software program is divided into an executable image, a data image, and an execution history image and loaded into random-access memory.

At task 1104, if the statement is classified as an executable statement, a local constant, or a singly de-referenced pointer, then that statement is executed at task 1110 in executable image in memory 1024.

If the statement to be operated on is not one of the three specified at task 1104, then that statement is processed in data image in memory 1028. All other data and data read-backs and write-backs in the overall software image are processed in data image in memory 1028. At task 1106, the statement is accessed in the data image using a computed offset into data image in memory 1028 from executable image in memory 1024. Then, at task 1108, the statement is processed in data image in memory 1028. In this way, over-writing a buffer beyond array boundaries can occur in data image in memory 1028, but not in executable image in memory 1024. Also, no executable statements residing in the over-flowed buffer will be executed from data image in memory 1028.

Optionally, at task 1112, the usage of executable statement or data image statements can be recorded in execution history image in memory 1026 for later analysis.

At tasks 1114 and 1116, if the program is not finished, the next statement is fetched and tasks 1104 through 1112 are repeated; otherwise, the program terminates.

Figure 12:
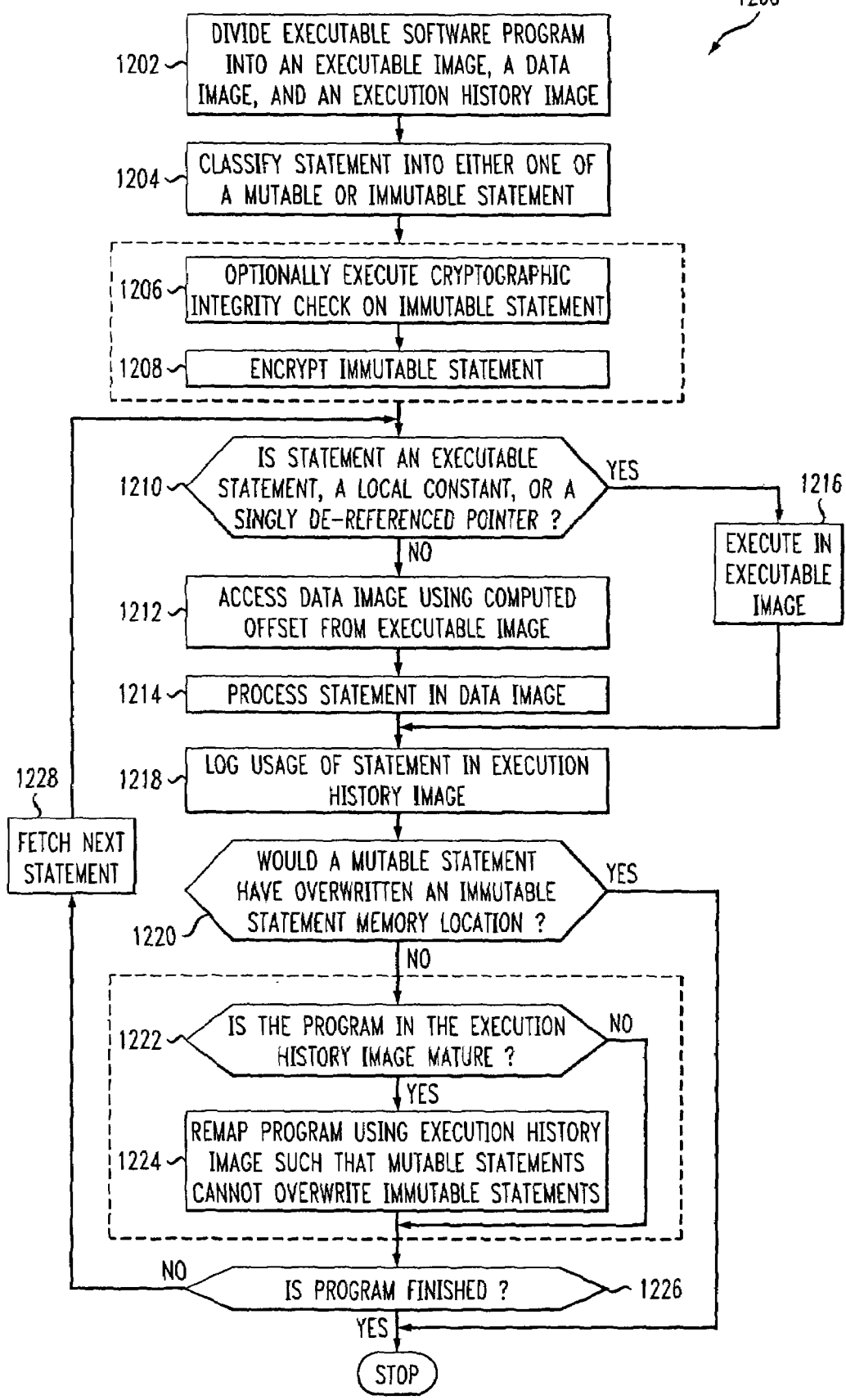
FIG. 12 is a flow chart depicting a second variation of the illustrative embodiment of the present invention.

FIG. 12 is a flowchart depicting a second variation of the illustrative embodiment of the present invention. As already described, at task 1202, an executable software program is divided into an executable image, a data image, and an execution history image and loaded into random-access memory.

At task 1204, in the execution history image, each statement is classified as either mutable (changeable) or immutable (not to be changed). The classification into mutable and immutable statements can be sub-divided further into one of the following:
1) Immutable executable locations
   a) executable statements
   b) single data constants
   c) singly de-referenced pointers to data
2) Immutable, multiply de-referenced pointers to data
3) Immutable data locations
4) Mutable pointer locations
5) Mutable data locations
6) Input buffers
7) Output buffers
8) Unused locations Some combination of statements as classified above are permitted, while others indicate unsafe code. For example, mutable data locations and input buffer locations can occur together, while a location that is used for mutable data and an immutable executable location is almost certainly a security risk. It is well-known in the art how to determine which combinations of statements as classified above might pose a security risk.

Optionally, at task 1206, cryptographic integrity checks can be run on an immutable statement. This is important since most buffer overflow attacks are directed against in-RAM executable images. In-RAM software integrity checks are most easily performed against immutable portions of the load image. In high security/trusted applications the cryptographic check-sums can be implemented in an Identity Friend or Foe format, including the use of trapdoor signature/public key verification.

Optionally, at task 1208, an immutable statement can be encrypted. Once encrypted, the attacker must first break the encryption before a buffer overflow attack becomes practical. This concludes the pre-execution analysis phase.

Tasks 1210 through 1216 of the second variation incorporate most of the first variation of the illustrative embodiment of the present invention with regard to the execution phase of the program under consideration.

At task 1210, if the statement is classified as an executable statement, a local constant, or a singly de-referenced pointer, then that statement is executed at task 1216 in the executable image.

If the statement to be operated on is not one of the three specified at task 1210, then that statement is processed in data image in memory 1028. All other data and data read-backs and write-backs in the overall software image are processed in data image in memory 1028. At task 1212, the statement is accessed in data image in memory 1028 using a computed offset into data image in memory 1028 from executable image in memory 1024. Then, at task 1214, the statement is processed in data image in memory 1028. In this way, over-writing a buffer beyond array boundaries occurs only in data image in memory 1028, and not in executable image in memory 1024. Also, no executable statements residing in the over-flowed buffer will be executed from data image in memory 1028.

At task 1218, the usage of executable statements or data image statements is recorded in execution history image in memory 1026. This constitutes a run-time analysis phase. Either the pre-execution analysis phase or the run-time analysis phase can be used alone or in combination with the other.

One method of thwarting sophisticated attacks is to implement task 1220. If a mutable statement has over-written an immutable statement memory location, then the program (process) is terminated. In a "sandbox technology" environment, the program might be allowed to run for some predetermined time and then the execution history image might be analyzed to identify problems. A "sandbox technology" environment is an execution environment that is a simulation only and executable statements do not write to peripherals in such a way as to cause destructive actions.

Another level of execution that provides even more protection against attacks is to implement optional tasks 1222 and 1224.

If it is decided, at task 1222, that the execution history image is now "mature," then task 1224 is executed. The execution history image is "mature" when the processing of statements has reached a point that the behavior of processing future statements is approximately predictable from the behavior of statements already processed. At task 1224, the entire program is re-mapped using the execution history image such that immutable statements cannot over-write mutable statements. The executable statements, immutable pointers, immutable data, mutable pointers, mutable data, output data, and input data can be re-mapped from the software package into a new executable image, with the mutable data "above" the mutable data. This is so any buffer overflow will tend to only overwrite data at the same or higher level of mutability.

As with the first variation, at task 1226, if the program is finished, it is terminated, otherwise, the next statement is fetched and control returns back to task 1210.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

I claim:

1. A method comprising:
   dividing an executable software program into an executable image, a data image, and an execution history image;
   storing said executable image, said data image, and said execution history image into a memory; and
   classifying a first statement in said execution history image into one of a mutable statement and an immutable statement.

2. The method of claim 1 further comprising:
   executing cryptographic integrity checks on said immutable statement; and
   encrypting said immutable statement.

3. The method of claim 1 further comprising:
   executing executable statements, local constants, and singly de-referenced pointers in said executable image;
   processing data, data write-backs, and data read-backs in said data image, wherein said data image is accessed from said executable image using a computed offset into said data image from said executable image;
   logging the usage of said first statement into said execution history image; and
   terminating said executable software program when a mutable statement changes an immutable statement in said memory.

4. The method of claim 3 further comprising re-mapping said first statement into a new executable software program wherein immutable statements are stored in locations in said memory such that executing mutable statements cannot overwrite mutable statements.

5. The method of claim 1 wherein classifying further comprises mapping said first statement into one of an executable statement, a single data constant, a singly de-referenced pointer to data, an immutable multiply de-referenced pointer to data, an immutable data location, a mutable pointer location, a mutable data location, an input buffer, an output buffer, and an unused location.

6. A method comprising:
   dividing an executable software program into an executable image, a data image, and an execution history image;
   storing said executable image, said data image, and said execution history image into a memory;
   executing executable statements, local constants, and singly de-referenced pointers in said executable image; and
   processing data, data write-backs, and data read-backs in said data image, wherein said data image is accessed from said executable image using a computed offset into said data image from said executable image.

7. The method of claim 6 further comprising logging the usage of a first statement into said execution history image as said statement is processed.

8. An apparatus comprising:
   a processor;
   a memory connected to said processor;
   an executable software program residing in said memory; and
   an operating system residing in said memory and executing on said processor, wherein said operating system comprises a software module for:
      dividing an executable software program in memory into an executable image, a data image, and an execution history image; and
      classifying a first statement in said execution history image into one of a mutable statement and an immutable statement.

9. The apparatus of claim 8 wherein said operating system further comprises a software module for:
   executing cryptographic integrity checks on said immutable statement; and
   encrypting said immutable statement.

10. The apparatus of claim 8 wherein said operating system further comprises a software module for:
    executing executable statements, local constant, and singly de-referenced pointers in said executable image;
    processing data, data write-backs, and data read-backs in said data image, wherein said data image is accessed from said executable image using a computed offset into said data image from said executable image;
    logging the usage of said first statement into said execution history image; and
    terminating said executable software program when a mutable statement changes an immutable statement in memory.

11. The apparatus of claim 10 wherein said operating system further comprises a software module for re-mapping said first statement into a new executable software program wherein immutable statements are stored in locations in memory such that executing mutable statements cannot overwrite mutable statements.

12. The apparatus of claim 8 wherein classifying further comprises mapping said first statement into one of an executable statement, a single data constant, a singly de-referenced pointer to data, an immutable multiply de-referenced pointer to data, an immutable data location, a mutable pointer location, a mutable data location, an input buffer, an output buffer, and an unused location.

13. An apparatus comprising:
a processor;
a memory connected to said processor;
an executable software program residing in said memory; and
an operating system residing in said memory and executing on said processor, wherein said operating system comprises a software module for:
dividing an executable software program in memory into an executable image, a data image, and an execution history image; and
executing a statement in said executable image, wherein said executing further comprises executing data write-backs and data read-backs in said data image, and wherein said data image is accessed using a computed offset into said data image from said executable image.

14. The apparatus of claim 13 wherein said operating system further comprises a software module for logging the usage of said statement into said execution history image as said statement is executed from said executable image.

15. An apparatus comprising:
a host computer comprising a memory and a processor;
an executable software program residing in said memory; and
an operating system residing in said memory and executing on said processor, wherein said operating system comprises a software module for:
dividing an executable software program in memory into an executable image, a data image, and an execution history image; and
classifying a first statement in said execution history image into one of a mutable statement and an immutable statement.

16. The apparatus of claim 15 wherein said operating system further comprises a software module for:
executing cryptographic integrity checks on said immutable statement; and
encrypting said immutable statement.

17. The apparatus of claim 15 wherein said operating system further comprises a software module for:
executing executable statements, local constant, and singly de-referenced pointers in said executable image;
processing data, data write-backs, and data read-backs in said data image, wherein said data image is accessed from said executable image using a computed offset into said data image from said executable image;
logging usage of said first statement into said execution history image; and
terminating said executable software program when a mutable statement changes an immutable statement in memory.

18. The apparatus of claim 17 wherein said operating system further comprises a software module for re-mapping said first statement into a new executable software program wherein immutable statements are stored in locations in memory such that executing mutable statements cannot overwrite mutable statements.

19. The apparatus of claim 15 wherein classifying further comprises mapping said first statement into one of an executable statement, a single data constant, a singly de-referenced pointer to data, an immutable multiply de-referenced pointer to data, an immutable data location, a mutable pointer location, a mutable data location, an input buffer, an output buffer, and an unused location.

20. An apparatus comprising:
a host computer comprising a memory and a processor;
an executable software program residing in said memory; and
an operating system residing in said memory and executing on said processor, wherein said operating system comprises a software module for:
dividing an executable software program in memory into an executable image, a data image, and an execution history image; and
executing a statement in said executable image, wherein said executing further comprises executing data write-backs and data read-backs in said data image, and wherein said data image is accessed using a computed offset into said data image from said executable image.

21. The apparatus of claim 20 wherein said operating system further comprises a software module for logging the usage of said statement into said execution history image as said statement is executed from said executable image.

22. A machine-readable medium comprising a software module for:
dividing an executable software program in memory into an executable image, a data image, and an execution history image; and
classifying a first statement in said execution history image into one of a mutable statement and an immutable statement.

23. The machine-readable medium of claim 22 further comprising a software module for:
executing cryptographic integrity checks on said immutable statement; and
encrypting said immutable statement.

24. The machine-readable medium of claim 22 further comprising a software module for:
executing executable statements, local constant, and singly de-referenced pointers in said executable image;
processing data, data write-backs, and data read-backs in said data image, wherein said data image is accessed from said executable image using a computed offset into said data image from said executable image;
logging the usage of said first statement into said execution history image; and
terminating said executable software program when a mutable statement changes an immutable statement in memory.

25. The machine-readable medium of claim 24 further comprising a software module for re-mapping said first statement into a new executable software program wherein immutable statements are stored in locations in memory such that executing mutable statements cannot overwrite mutable statements.

26. The machine-readable medium of claim 22 wherein classifying further comprises mapping said first statement into one of an executable statement, a single data constant, a singly de-referenced pointer to data, an immutable multiply de-referenced pointer to data, an immutable data location, a mutable pointer location, a mutable data location, an input buffer, an output buffer, and an unused location.

27. A machine-readable medium comprising a software module for:
dividing an executable software program in memory into an executable image, a data image, and an execution history image; and
executing a statement in said executable image, wherein said executing further comprises executing data write-backs and data read-backs in said data image, and wherein said data image is accessed using a computed offset into said data image from said executable image.

28. The machine-readable medium of claim 27 further comprising a software module for logging the usage of said statement into said execution history image as said statement is executed from said executable image.

* * * * *